(12) United States Patent
Finkelman et al.

(10) Patent No.: US 10,097,428 B2
(45) Date of Patent: *Oct. 9, 2018

(54) SYSTEM AND METHOD FOR CACHING POPULAR CONTENT RESPECTIVE OF A CONTENT STRONG SERVER IN AN ASYMMETRICAL ROUTING TOPOLOGY

(71) Applicant: Qwilt, Inc., Redwood City, CA (US)

(72) Inventors: Ori Finkelman, Hod-Hasharon (IL); Udi Lerner, Redwood City, CA (US); Adan Alper, Hod-Hasharon (IL); Yoav Einav, Hod-Hasharon (IL); Hagai Avrahami, Hod-Hasharon (IL); Yoav Gressel, Hod-Hasharon (IL)

(73) Assignee: Qwilt, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,506

(22) Filed: Mar. 23, 2016

(65) Prior Publication Data

US 2017/0019316 A1 Jan. 19, 2017

Related U.S. Application Data

(63) Continuation-in-part of application No. 13/006,785, filed on Jan. 14, 2011, now Pat. No. 9,723,073.

(Continued)

(51) Int. Cl.
*G06F 15/173* (2006.01)
*H04L 12/26* (2006.01)
*H04L 29/08* (2006.01)

(52) U.S. Cl.
CPC ...... *H04L 43/028* (2013.01); *H04L 29/08729* (2013.01); *H04L 67/1095* (2013.01); *H04L 67/32* (2013.01)

(58) Field of Classification Search
CPC .......... H04L 29/08729; H04L 67/1095; H04L 29/08774; H04L 29/0881; H04L 29/08891;

(Continued)

(56) References Cited

U.S. PATENT DOCUMENTS

| 5,933,603 A | 8/1999 | Vahalia et al. |
| 6,049,530 A | 4/2000 | Petersen et al. |

(Continued)

OTHER PUBLICATIONS

Non-Final Office Action dated Sep. 25, 2012 for U.S. Appl. No. 13/006,785.

(Continued)

*Primary Examiner* — Davoud Zand
(74) *Attorney, Agent, or Firm* — M&B IP Analysts, LLC

(57) ABSTRACT

A computerized method of delivering popular content of a service delivery apparatus (SDA) in an asymmetrical network topology. The method comprises receiving a first acquisition request for content from a user node (UN) over an upstream data link, the request comprising at least a content identification (CID). An instruction is sent to the UN to redirect content requests to the SDA. A second acquisition request is sent from the SDA to a content source (CS) for the content requested by the first acquisition request, upon determination that the downstream data link between the UN and the CS is inaccessible to the SDA, the request including at least the CID. The content is received by the SDA from the CS. The received content from the SDA is sent to the UN.

11 Claims, 6 Drawing Sheets

Related U.S. Application Data

(60) Provisional application No. 62/146,266, filed on Apr. 11, 2015, provisional application No. 62/140,067, filed on Mar. 30, 2015, provisional application No. 61/375,836, filed on Aug. 22, 2010.

(58) Field of Classification Search
CPC .............. H04L 67/1097; H04L 67/2847; H04L 67/2842; H04L 67/2852
USPC .......... 709/223, 224; 340/1.1–16.1; 370/252; 714/39, 47.1–47.3
See application file for complete search history.

(56) References Cited

U.S. PATENT DOCUMENTS

| | | | |
|---|---|---|---|
| 6,363,413 B2 | 3/2002 | Kidder | |
| 6,536,037 B1 | 3/2003 | Guheen et al. | |
| 6,615,166 B1 | 9/2003 | Guheen et al. | |
| 6,700,889 B1 | 3/2004 | Nun | |
| 6,772,193 B1 | 8/2004 | Igawa et al. | |
| 6,799,248 B2 | 9/2004 | Scherr | |
| 6,823,401 B2 | 11/2004 | Feather et al. | |
| 6,831,893 B1 | 12/2004 | Ben Nun et al. | |
| 6,873,600 B1 | 3/2005 | Duffield et al. | |
| 6,985,956 B2 | 1/2006 | Luke et al. | |
| 6,986,018 B2 | 1/2006 | O'Rourke et al. | |
| 7,149,698 B2 | 12/2006 | Guheen et al. | |
| 7,281,260 B2 | 10/2007 | Puente et al. | |
| 7,310,480 B2 | 12/2007 | Maciocco et al. | |
| 7,349,979 B1 | 3/2008 | Cieslak et al. | |
| 7,436,830 B2 | 10/2008 | Ben-Nun et al. | |
| 7,596,664 B2 | 9/2009 | Ishikawa et al. | |
| 7,606,314 B2 | 10/2009 | Coleman et al. | |
| 7,685,254 B2 | 3/2010 | Pandya | |
| 7,697,557 B2* | 4/2010 | Segel | H04L 67/104 370/429 |
| 7,719,966 B2 | 5/2010 | Luft et al. | |
| 7,818,402 B1* | 10/2010 | Zhang | H04L 61/1582 709/219 |
| 7,912,921 B2 | 3/2011 | O'Rourke et al. | |
| 7,957,396 B1 | 6/2011 | Kohn et al. | |
| 8,009,682 B2 | 8/2011 | Gopinath et al. | |
| 8,065,559 B2 | 11/2011 | Kamath et al. | |
| 8,621,101 B1 | 12/2013 | Starr et al. | |
| 8,737,407 B2 | 5/2014 | Shetty et al. | |
| 8,937,942 B1 | 1/2015 | Li et al. | |
| 2001/0049732 A1* | 12/2001 | Raciborski | G06F 17/30864 709/224 |
| 2001/0051980 A1* | 12/2001 | Raciborski | G06F 17/30864 709/203 |
| 2002/0006124 A1 | 1/2002 | Jimenez et al. | |
| 2002/0040366 A1* | 4/2002 | Lahr | G06F 17/30887 |
| 2002/0040404 A1* | 4/2002 | Lahr | H04L 29/06027 709/231 |
| 2002/0042817 A1* | 4/2002 | Lahr | H04N 21/2221 709/213 |
| 2002/0048269 A1* | 4/2002 | Hong | H04L 29/06 370/389 |
| 2002/0062372 A1 | 5/2002 | Hong et al. | |
| 2002/0136204 A1* | 9/2002 | Chen | G06Q 30/02 370/352 |
| 2003/0097443 A1* | 5/2003 | Gillett | H04L 29/06 709/225 |
| 2003/0221127 A1* | 11/2003 | Risan | H04L 63/062 725/25 |
| 2004/0128693 A1* | 7/2004 | Weigand | H04N 7/17318 725/95 |
| 2004/0133776 A1* | 7/2004 | Putzolu | G06F 9/4868 713/153 |
| 2004/0181579 A1* | 9/2004 | Huck | G06Q 10/10 709/205 |
| 2005/0015702 A1 | 1/2005 | Shier et al. | |
| 2005/0022237 A1 | 1/2005 | Nomura | |
| 2005/0213514 A1 | 9/2005 | Su et al. | |
| 2006/0129697 A1 | 6/2006 | Vange et al. | |
| 2006/0168318 A1* | 7/2006 | Twiss | H04L 45/00 709/238 |
| 2006/0271972 A1 | 11/2006 | Pai et al. | |
| 2007/0050686 A1 | 3/2007 | Keeton et al. | |
| 2007/0124781 A1 | 5/2007 | Casey et al. | |
| 2007/0192474 A1 | 8/2007 | Decasper et al. | |
| 2007/0244987 A1* | 10/2007 | Pedersen | H04L 63/0272 709/217 |
| 2009/0083279 A1 | 3/2009 | Hasek | |
| 2009/0119734 A1 | 5/2009 | Deshpande et al. | |
| 2009/0172565 A1* | 7/2009 | Jackson | H04L 67/1095 715/753 |
| 2009/0193129 A1* | 7/2009 | Agarwal | H04L 63/0281 709/229 |
| 2009/0307757 A1 | 12/2009 | Groten | |
| 2009/0313437 A1 | 12/2009 | Sofman et al. | |
| 2010/0023726 A1 | 1/2010 | Aviles | |
| 2010/0054257 A1 | 3/2010 | Dolganow et al. | |
| 2010/0082774 A1 | 4/2010 | Pitts | |
| 2010/0115072 A1 | 5/2010 | Payyappilly et al. | |
| 2010/0287227 A1 | 11/2010 | Goel et al. | |
| 2011/0055386 A1 | 3/2011 | Middleton et al. | |
| 2011/0078343 A1 | 3/2011 | Resch et al. | |
| 2011/0141887 A1 | 6/2011 | Klein et al. | |
| 2011/0153937 A1 | 6/2011 | Annamalaisami et al. | |
| 2012/0011271 A1 | 1/2012 | Zhao et al. | |
| 2012/0030212 A1 | 2/2012 | Koopmans et al. | |
| 2012/0047224 A1 | 2/2012 | Shemesh et al. | |
| 2012/0047252 A1 | 2/2012 | Maor et al. | |
| 2012/0057460 A1 | 3/2012 | Hussain et al. | |
| 2012/0117610 A1 | 5/2012 | Pandya | |
| 2012/0159329 A1 | 6/2012 | Chow et al. | |
| 2012/0159558 A1 | 6/2012 | Whyte et al. | |
| 2014/0108586 A1 | 4/2014 | Zhao | |
| 2016/0021057 A1 | 1/2016 | Frost et al. | |

OTHER PUBLICATIONS

Non-Final Office Action dated Jul. 26, 2012 in U.S. Appl. No. 13/006,875.

* cited by examiner

SYSTEM AND METHOD FOR CACHING POPULAR CONTENT RESPECTIVE OF A CONTENT STRONG SERVER IN AN ASYMMETRICAL ROUTING TOPOLOGY

CROSS-REFERENCE TO RELATED PATENT APPLICATION

This is a continuation-in-part application of a U.S. application Ser. No. 13/006,785, titled "A System for Detection of Content Servers and Caching Popular Content Therein", filed on Jan. 14, 2011, which claims priority from U.S. provisional patent application 61/375,836, titled "A System for Detection of Content Servers and Caching Popular Content Therein", filed on Aug. 22, 2010, and both assigned to common assignee and are incorporated herein in their entireties by reference. This application claims priority from U.S. provisional patent application 62/140,067 filed on Mar. 30, 2015 and p U.S. provisional patent application 62/146,266 filed on Apr. 11, 2015, the contents of both applications are hereby incorporated by reference into this application.

BACKGROUND

Field

The disclosure generally relates to classification of packets transmitted in a network, particularly to the determination of content to be stored in storage located along the network based on the type of data transferred in the packet, and more particularly to performing said determination and classification using a plurality of content storing servers.

Description of the Related Art

Service providers worldwide are facing a mounting problem of flattening revenues coupled with increasing costs brought forth by increasing usage of bandwidth, growing switching clients, subscriber saturation and price competition. These mobile and broadband providers are facing challenges in delivering new revenue generating services while seeing their over the top (OTT) counterparts reaping rewards from content delivered over the networks they built and maintained over years.

The vast majority of these OTT services are delivered over hypertext transfer protocol (HTTP), the de-facto protocol for application development and delivery. Whether it is video, social networking, search, or advertising, or whether it is over fixed line or mobile applications, it is most likely running over HTTP. However, this protocol is also the most process intensive protocol for network devices. Hence practically any increase in usage results in increase the traffic on the service providers.

Certainly controlling traffic on the Internet requires various levels of understanding of the traffic that flows through the network which also increases in its level of sophistication. Various systems and solutions have been offered to enable deep-packet-inspection (DPI) to enable an ever sophisticated ability to shape the traffic on the network. This system allows the service providers to better manage the network and its related resources and provide a higher level of quality of service (QoS) to increase revenues and profits. However, the rapid increase in the delivery of heavy bandwidth consuming data, such as video, requires a new level of handling system that is not available today in related art solutions. A known problem is that an access of a user node to a content source and a subsequent access by another user node to the same content result in additional traffic load on the content provider and on the entire network. When, for example, a popular video clip is accessed by multiple user nodes, there is a significant and noticeable degradation of the network performance that may even lead to network failure. Some related art solutions attempt to store all the data in caches. However, the huge amounts of data where each and every packet is needed to be inspected, regardless of its source, makes this a daunting and impractical task.

It would be advantageous to provide service providers a solution that will enable them to effectively manage and control the delivery of heavy bandwidth consuming data such that the overall bandwidth requirements are loaded and shared across the network in general, particularly within the network of a specific service provider. It would be further advantageous to provide a system and method to overcome asymmetrical aspects of routing topologies.

SUMMARY

To realize some of the advantages described above, there is provided a computerized method of delivering popular content of a service delivery apparatus (SDA) in an asymmetrical network topology. The method comprises receiving a first acquisition request for content from a user node (UN) over an upstream data link, the request comprising at least a content identification (CID). An instruction is sent to the UN to redirect content requests to the SDA. A second acquisition request is sent from the SDA to a content source (CS) for the content requested by the first acquisition request, upon determination that the downstream data link between the UN and the CS is inaccessible to the SDA, the request including at least the CID. The content is received by the SDA from the CS. The received content from the SDA is sent to the UN.

In a specific enhancement the request for content from the user node further comprises any of a content source (CS) and a session ID.

In another specific enhancement the method further comprises determining if the requested content needs to be acquired.

In yet another specific enhancement the method further comprises storing the content in a storage of the SDA upon determination that the content needs to be acquired.

Another aspect of the disclosed teachings is a service delivery apparatus (SDA) for delivering popular content in an asymmetrical network topology. The apparatus comprises a first network interface to sniff traffic between at least a first portion of a network and at least a second portion of a network. A a deep-packet-inspection (DPI) unit is coupled to the first network interface and configured to identify at least a source of content of the sniffed traffic, the DPI unit further inspecting one or more packets, through the first network interface from the identified source of content, each packet having at least a specific source address and a specific destination address. A storage is provided for storing at least information of the content received through the first network interface. A second network interface is configured to communicate with the at least a first portion of the network and the at least a second portion of the network. A processor which is configured to cause the SDA to send an instruction to the UN to redirect content requests to the SDA on receiving a request for the content from a user node (UN), the request comprising at least a content identification (CID). The processor is further configured to send a request to a content source (CS) for the content, the request including the CID upon determination that the downstream data link between the UN and the CS is inaccessible to the SDA.

More specifically the request for content from the user node further comprising: any of a content source (CS) and a session ID.

More Specifically, the SDA is connected in the first network interface in a sniffer mode.

More specifically, the SDA is connected in the first network interface in a "bump-in-a-wire" mode.

More specifically, the DPI is configured with data types to look for in a data packet.

BRIEF DESCRIPTION OF THE DRAWINGS

The subject matter disclosed herein is particularly pointed out and distinctly claimed in the claims at the conclusion of the specification. The foregoing and other objects, features and advantages will be apparent from the following detailed description taken in conjunction with the accompanying drawings.

DETAILED DESCRIPTION

Figure 1A:
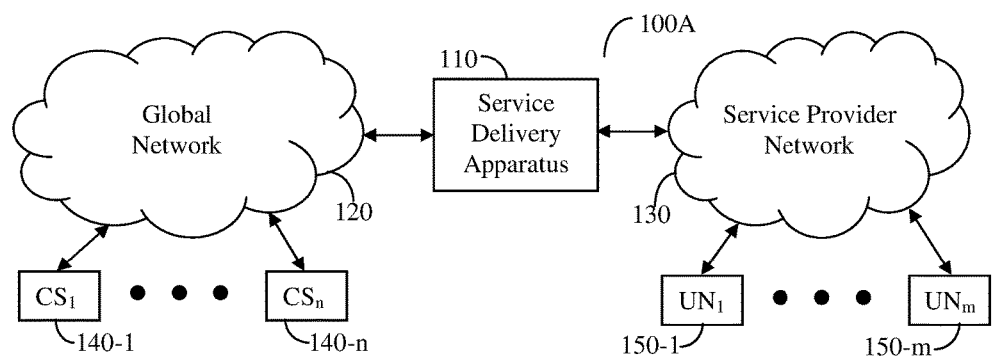
FIG. 1A—is a block diagram of a basic network system operating as a bump-in the wire according to an exemplary embodiment FIG. 1B—is a block diagram of a basic network system operating as a sniffer according to an exemplary embodiment FIG. 2—is a block diagram of an apparatus to identify content sources and provide content from the apparatus in accordance with the principles of the exemplary embodiment.

It is important to note that the embodiments disclosed are only examples of the many advantageous uses of the innovative teachings herein. In general, statements made in the specification of the present application do not limit any of the various claims. Moreover, some statements may apply to some inventive features but not to others. In general, unless otherwise indicated, singular elements may be a plural and vice versa with no loss of generality. In the drawings, like numerals refer to like parts through several views.

Communication networks which provide internet access to user nodes (UNs) typically employ an asymmetrical structure. Asymmetrical network topologies prioritize bandwidth to downstream links over upstream links. Upstream links convey requests for content, while downstream links convey the requested content itself. A service delivery apparatus (SDA) which has an access only to an upstream link of a network respective of a UN, is able to determine whether content from a content source (CS) is popular. However, SDA cannot acquire the content because the downstream link respective of the UN is not accessible. The SDA requests the content from the CS, receives the content and sends the received content to the UN. The SDA sends the UN an instruction to redirect the request for content from the CS to the SDA.

Figure 1B:
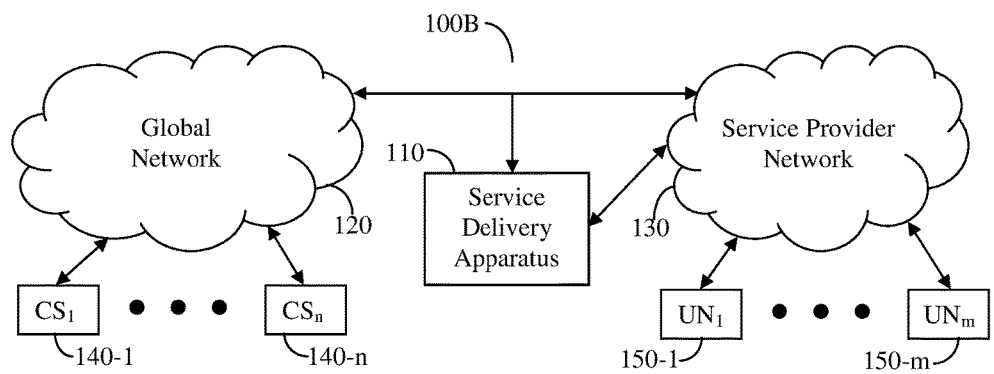

Reference is now made to FIG. 1A where an exemplary and non-limiting block diagram 100A of a basic network system according to an exemplary embodiment is shown. The system depicted comprises of a global network 120 and a service provider network 130 that are coupled by a 'bump-in-the-wire' apparatus 110. While the networks 120 and 130 are shown as detached from each other it should be noted that this is only an exemplary configuration and other configurations are possible without departing from the principles of the disclosure. A network may be a Local Area Network (LAN), Wide Area Network (WAN), Metro Area Network (MAN), World Wide Web (WWW), Internet, combinations thereof, or the like. There are one or more content sources (CSs) connected to the global network 120, shown as $CS_1$ 140-1 through $CS_n$ 140-n, commonly referred to as CS 140. The content sources provide content upon request, for example video clips, from the appropriate CS to the requestor. There are one or more user nodes (UNs) connected to the service provider network 130, shown as $UN_1$ 150-1 through $UN_m$ 150-m, commonly referred to as UN 150. When an UN 150 requests content from a CS 140, it is transferred, according to an exemplary embodiment, through a service delivery apparatus (SDA) 110, the function of which is described in more detail herein below. Generally, the SDA 110 may provide the requested content from its storage, or when such content or portions thereof are not in the storage of the SDA 110, then the request is forwarded to the appropriate CS 140 for the delivery of the content as further described below. FIG. 1B depicts an exemplary and non-limiting block diagram 100B of a basic network system operating as a sniffer according to an exemplary embodiment. Operating similarly to the system shown in FIG. 1A, the system 100B has a SDA 110 connected in a sniffer mode, i.e., the SDA merely observes the traffic moving between a global network 120 and a service provider network 130 without routing packets through it. When the SDA 110 is connected in sniffer mode, it will typically connect to the service provider network 130 through a separate communication port to provide content stored therein to a destination connected to the service provider network 130.

Figure 2:
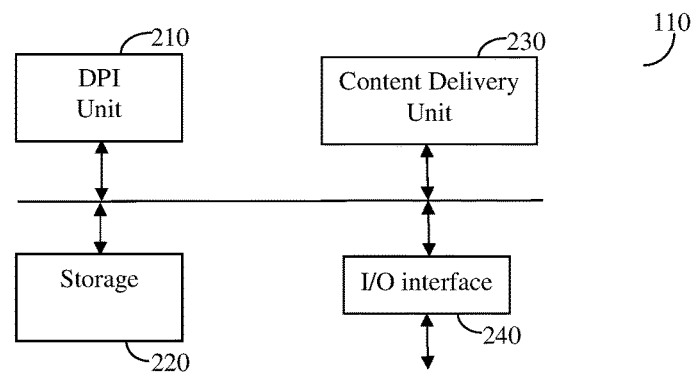

FIG. 2 provides an exemplary and non-limiting block diagram of a SDA 110 that identifies content sources and provides content from the apparatus in accordance with an exemplary embodiment. The SDA 110 comprises a deep-pocket-inspection (DPI) unit 210, a storage 220, a content delivery unit (CDU) 230 and an input/output interface 240. According to the exemplary embodiment, the DPI unit 210 performs two separate tasks. The first task is to identify sources of content that potentially contain data that may be worthwhile to store in the storage 220. For example, video servers may be located throughout the global network 120 and accessed randomly by UNs 150 through the service provider network 130. In order to improve the deficiencies of related art solutions, the apparatus 110 is implemented differently. The DPI unit 210 is provided with data types to look for in data packets that are transmitted through the apparatus 110. Instead of inspecting each and every packet, DPI unit 210 may inspect only one in a certain number of packets (for example, one-in-a-thousand packets) out of the entire traffic, thereby significantly lowering the processing load. It should be understood that the method for selecting the sampled packets is typically not performed by using a simple counter to process one out of every predetermined number of packets. Instead, the source and the destination addresses from each packet are fed into a hash function, the hash function result is compared to a configurable threshold, and the result of this comparison determines if the packet is inspected or not. In addition, it should be understood that the hash function is symmetric with respect to the source and the destination addresses, such that swapping the source address and the destination address does not change the hash result. In another exemplary embodiment a source and a destination ports may also be used as part of the hash function operation. This guarantees that each flow comprising of multiple packets sent between a UN 150 and a CS 140 is either fully ignored or fully inspected. Upon determination that a specific CS 140 provides a desired data type, the identification of that CS 140 is stored. Any future packet received from or sent to the identified CS 140 is inspected by the DPI unit 210, and if the packet contains content that may be worthwhile to store, such content is stored in the storage 220. This inspection ensures that a demand for highly popular content from a popular CS 140 is likely to be quickly detected, while infrequent access to a CS 140 would typically not impact the operation of the system. It should be noted that identification of a CS 140 does not have to be on the first detection of a data, and threshold levels may be used, as well as an aging mechanism so that relatively infrequently accessed CSs 140 would lose older access count so the CSs 140 does not hit the threshold value.

While DPI unit 210 operates on packets that arrive from CSs 140, the CDU 230 operates with respect to requests for content received from the UNs 150 through the service provider network 130. Upon receipt of such a request, the DPI 210 first determines if the content of the requested CS 140 actually is stored in the storage 220 by checking that the CS 140 identification is stored in the apparatus 110. If the identification is found, the storage 220 is checked for the possibility of delivery of the content or portions thereof. If the entire content or portions thereof are found, then they are delivered to the requesting UN 150. If the entire content or certain portions are missing, then the request is forwarded to the appropriate CS 140. Storage 220 may be semiconductor media, magnetic media, or any other types of storage media appropriate for the storage of content.

Figure 3:
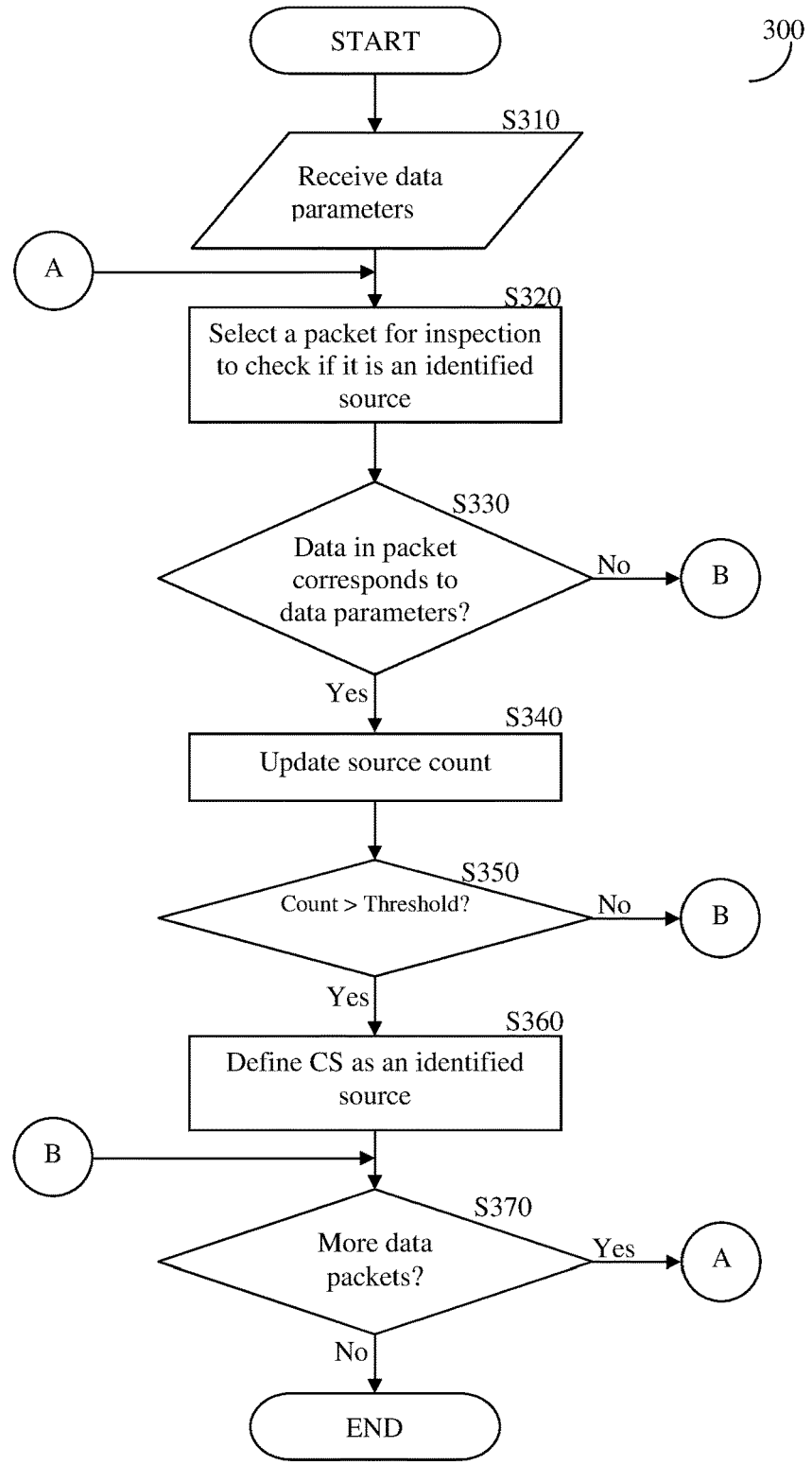
FIG. 3—is a flowchart depicting the identification of a content source in accordance with an exemplary embodiment.

Reference is now made to FIG. 3 of an exemplary and non-limiting flowchart 300 depicting the identification of a content source in accordance with an exemplary embodiment. In S310, an apparatus receives and/or fetches parameters relating to the data of interest in the CSs. For example, it may contain parameters pertaining to video data type. In S320, packets are selected from the network traffic, for example, a global network 120. The ratio between the number of packets that pass through the network and the number inspected may be configured, so it could be one-in-a-thousand, one-in-ten-thousand, and so on. In S330, the data in the packet is checked to see if it corresponds to the data parameters, e.g., contain video data, and if so execution continues to S340; otherwise, execution continues to S370. In S340, the count of the CS 140 is updated, for example, by incrementing the value of a counter. In S350, it is checked if the count for that CS 140 has exceeded a threshold value, and if so, execution continues to S360; otherwise, execution continues to S370. In one exemplary embodiment, the count may also have an aging mechanism (not shown) as described above. Furthermore, different data types may have different thresholds, different count increases, and different count aging. In S360, the CS 140 is identified as a source of content eligible for storage in the storage 220. In S370, it is checked if there are more data packets to be inspected, and if so, execution continues to S320; otherwise execution terminates.

Figure 4:
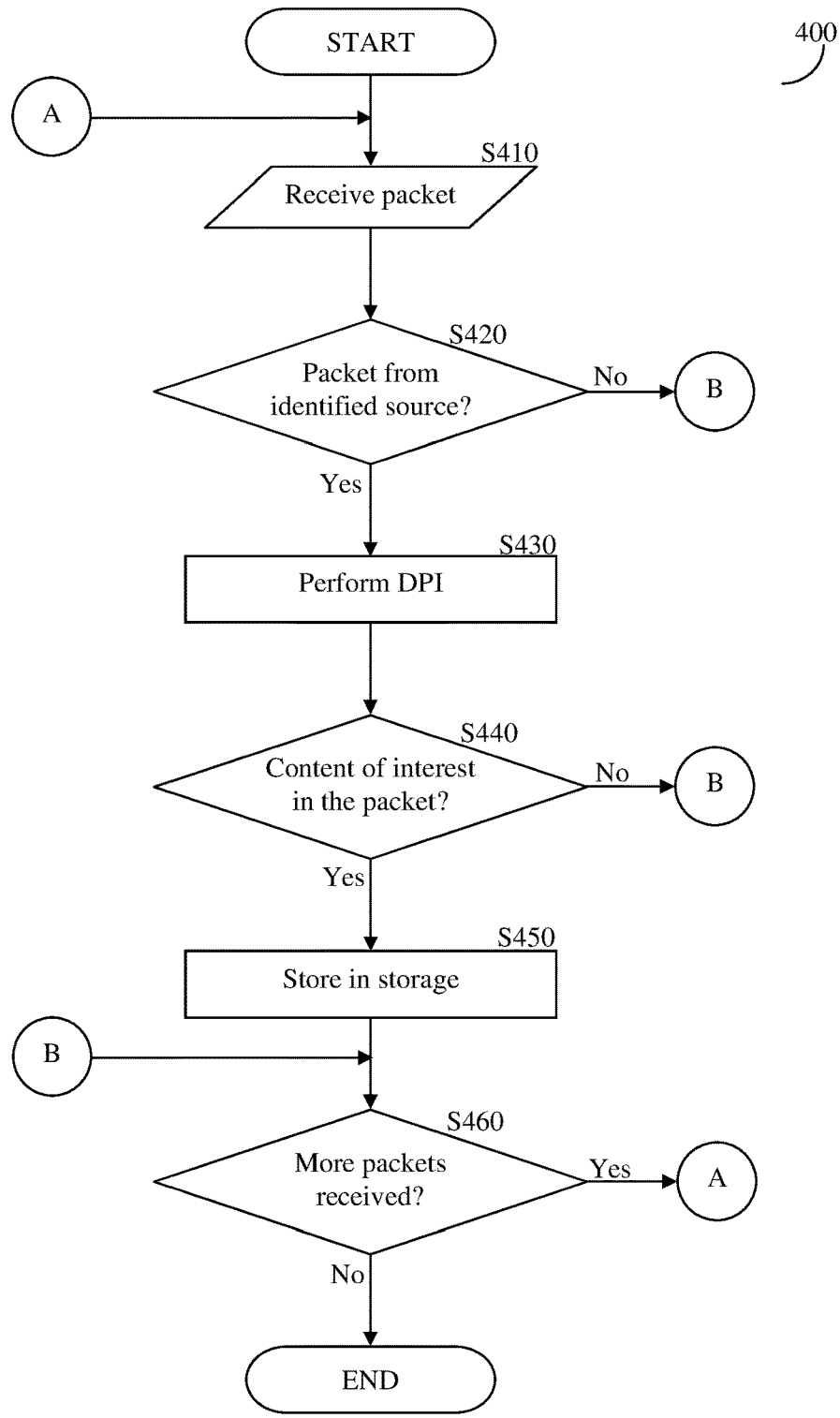
FIG. 4—is a flowchart depicting the storage of content from identified content sources in the storage of the apparatus according to an exemplary embodiment.

Reference is now made to FIG. 4 of an exemplary and non-limiting flowchart 400 depicting the storage of content from identified CS 140 in the storage 220 of the apparatus 110 according to an exemplary embodiment. In S410, a packet is received by apparatus 110. In S420, it is checked whether the received packet is from an identified CS 140, and if so, execution continues to S430; otherwise execution continues to S460. In S430, the received packet is inspected by a DPI unit 210 to identify content of the packet. This step is performed to check if the packet actually contains the content of interest so waste of storage space in the storage 220 can be prevented from storing unnecessary content because it is from an identified CS 140. In S440, it is checked whether such content of interest was found, and if so, execution continues to S450; otherwise, execution continues to S460. In S450, the content of the received packet is stored in the storage 220. In S460, it is checked whether more packets are received, and if so, execution continues to S410; otherwise, execution terminates.

Figure 5:
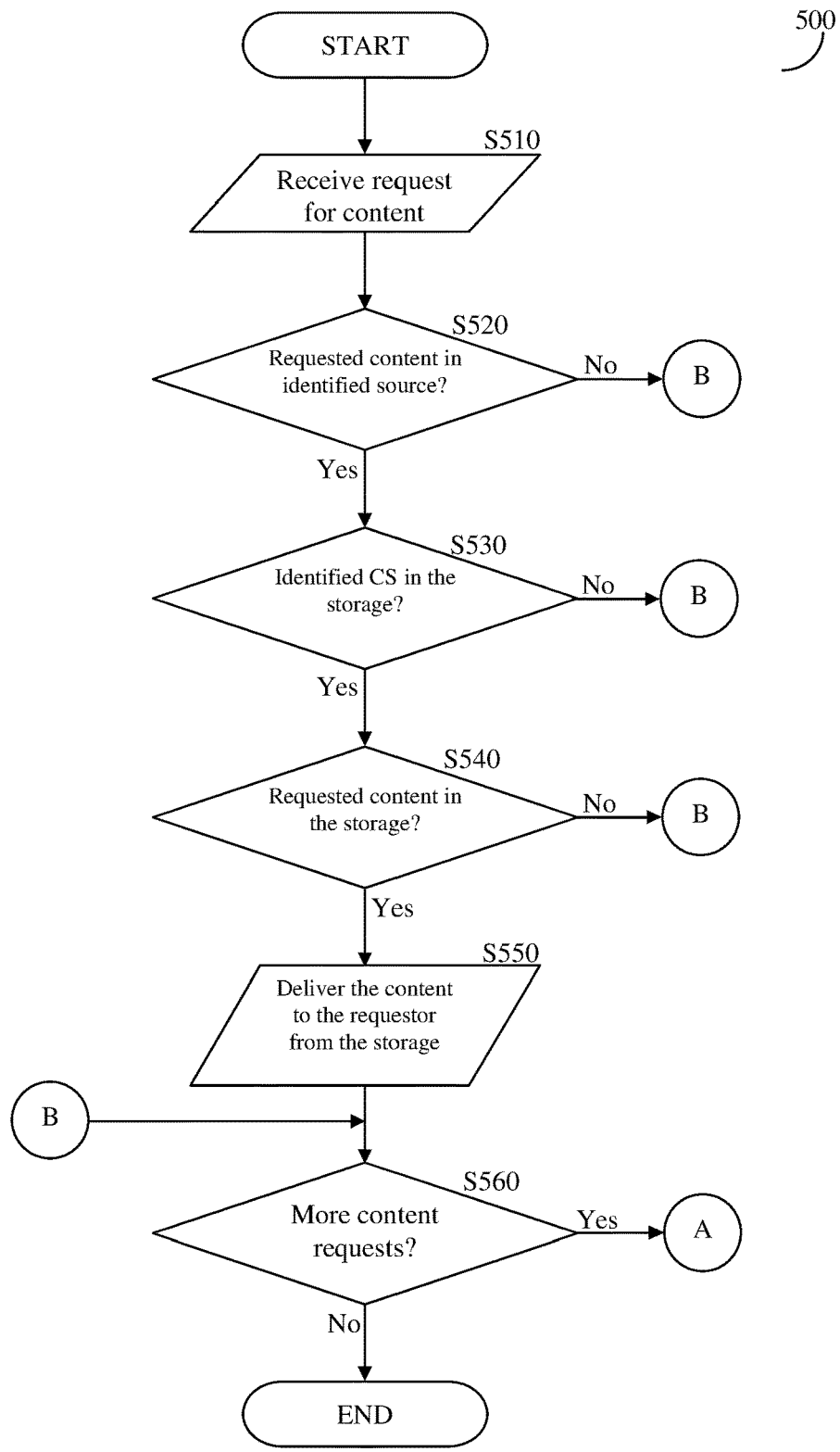
FIG. 5—is a flowchart describing the providing of content to a requesting node according to an exemplary embodiment.

Reference is now made to FIG. 5 of an exemplary and non-limiting flowchart 500 describing the providing of content to a requesting UN 150 according to an exemplary embodiment. In S510, an apparatus 110 receives a request for content from a UN 150. In S520, it is checked if the requested content is in an identified CS 140, and if so, execution continues to S530; otherwise, execution continues to S560. In S530, it is checked whether the identified CS 140 is stored in the storage 220, and if so, execution continues to S540; otherwise, execution continues to S560. In S540, it is checked whether the requested content is in the storage 220, and if so, execution continues to S550; otherwise, execution continues to S560. In S550, the content is delivered to the requesting UN 150. In S560, it is checked whether additional content requests exist, and if so, execution continues to S510; otherwise, execution terminates.

In one exemplary embodiment, upon detecting that a portion of the requested content is in the storage 220 and deliverable to the requesting UN 150, such content is delivered immediately to the UN 150 while only the missing portions of the content is requested from the corresponding CS 140. Hence, a request from the CDU 230 may be for the portions of the requested content. In an exemplary embodiment, once a DPI unit 210 determines that a CS 140 may contain content that needs to be stored in the storage 220, the packets from such CS 140 are consistently inspected for determination of popular content.

The methods described above are particularly efficient when an SDA has access to both a request from a UN for a content, and a reply from a CS sending the content. However, often network traffics are asymmetrical. For example, a request for content may be be a few hundred bytes of data sent upstream, while the content itself may be millions of bytes of data sent downstream. Thus, many service providers employ asymmetrical network topologies, for example by affording more network resources for downloading data, at the expense of resources, for uploading data. A SDA may have an access to either or both downstream and upstream data.

Figure 6:
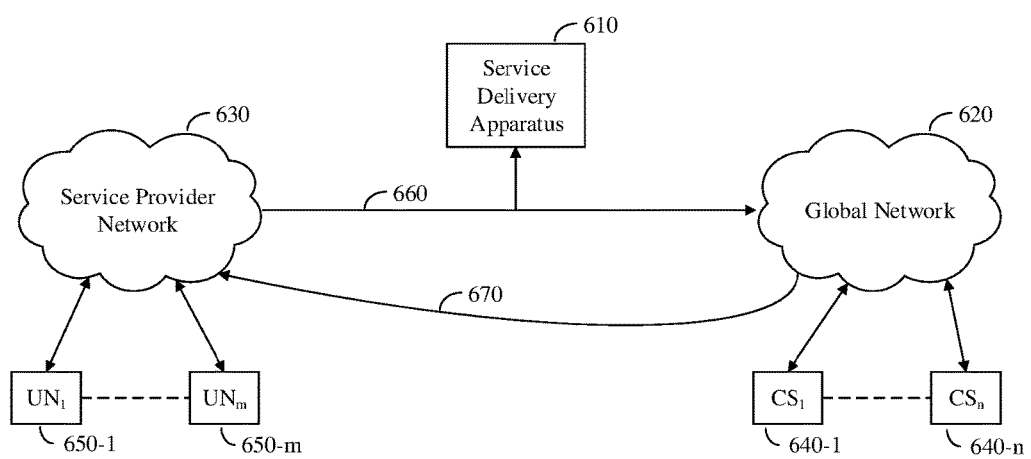
FIG. 6—is a schematic illustration of a basic network system and a Service Delivery Apparatus (SDA) operating as a sniffer according to an exemplary embodiment.

FIG. 6 is a non-limiting exemplary schematic illustration of a basic network system and a SDA operating as a sniffer according to an exemplary embodiment. Operating similarly to the system shown in FIG. 1B, the SDA 610 is connected in a sniffer mode. It is understood that in other embodiments, the SDA 610 may operate in a manner similar to the SDA 110A of FIG. 1A, with proper configuration. The SDA 610 is capable of sniffing upstream data 660 between a service provider network (SPN) 630 and global network 620. The SDA 610 is not connected to downstream data 670 between the global network 620 and the SPN 630. Thus, the SDA is able to determine that content from a content source, such as $CS_1$ 640-1, should be stored. This may be accomplished, for example, by the method described in FIG. 2. However, the SDA cannot actually acquire the content, as described in more detail with respect of FIG. 4, since the content itself is delivered to the SPN 630 over downstream data 670. In such embodiment, it is advantageous if the SDA 610 requests the content directly from CSs 640.

Figure 7:
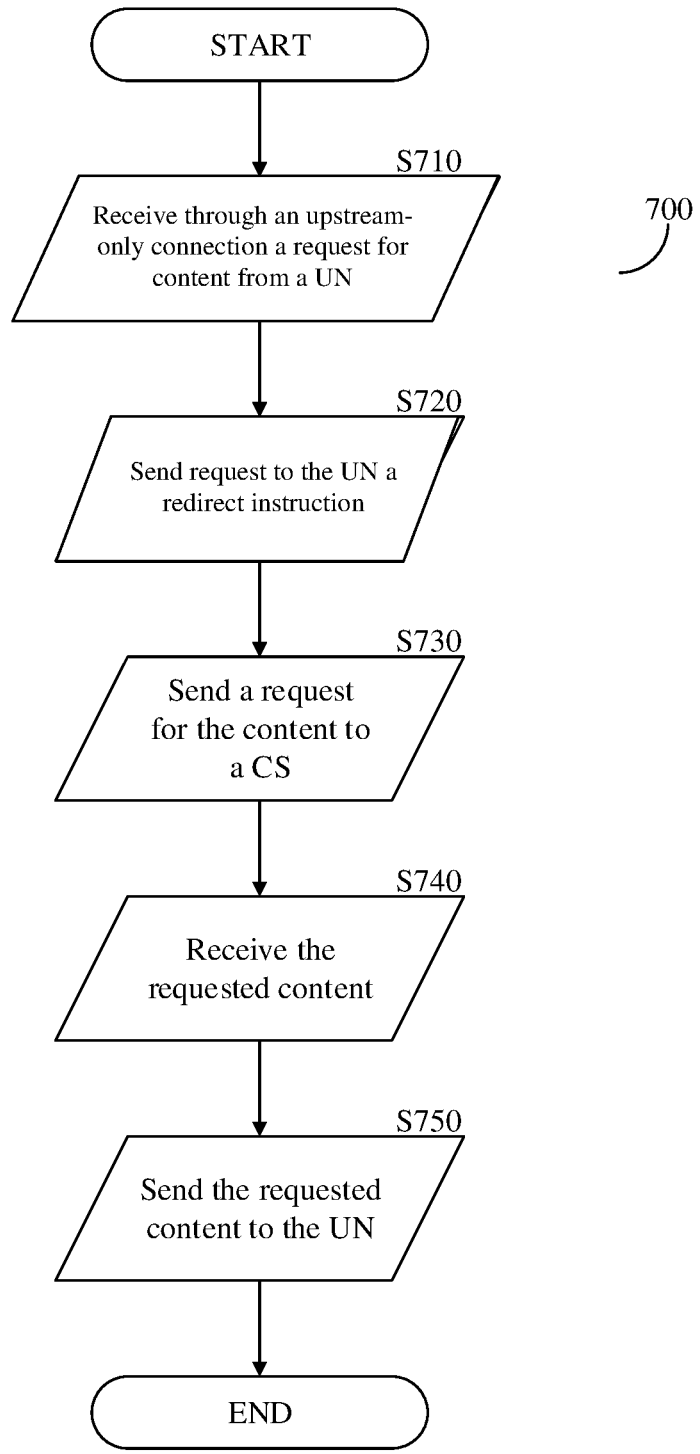
FIG. 7—is a flowchart of a method for caching and providing popular content in an asymmetrical network topology in accordance with an exemplary embodiment.

FIG. 7 is a non-limiting exemplary flowchart 700 of a method for caching and providing popular content in an asymmetrical network topology. In S710, a request for content is received by an SDA from a UN over an upstream data connection. The request includes at least a content ID (CID), wherein the SDA is connected to the upstream data connection respective of the UN and is disconnected from the downstream data connection respective of the UN. The request may further include a content source (CS) and a session ID. In S720, an instruction to redirect content requests, for example, to the SDA, is sent to the UN. In S730, a request for the content of S710 is sent to the CS, wherein the request includes the CID. In S740, the content is received by the SDA from the CS. In some embodiments, content may be stored in a storage of the SDA, upon determination that the content needs to be stored. In S750, the content is sent from the SDA to the requesting UN.

The principles disclosed herein may be implemented in hardware, firmware, software or any combination thereof. Moreover, a software is preferably implemented as an application program tangibly embodied in a program storage unit or computer readable medium. The application program may be uploaded to, and executed by a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit, a printing unit, and/or display unit.

All examples and conditional languages recited herein are intended for pedagogical purposes to aid the reader in understanding the principles disclosed herein and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method of delivering popular content of a service delivery apparatus (SDA) in an asymmetrical network topology, the asymmetrical network topology being such that the SDA has access to upstream communication originated from a user node (UN) but not to downstream communication being sent to the UN, the method comprising:
   receiving, by the SDA, a first acquisition request for content from the UN over an upstream data link, the request comprising at least a content identification (CID);
   sending an instruction from the SDA to the UN to redirect content requests to the SDA;
   sending a second acquisition request from the SDA to a content source (CS) for the content requested by the first acquisition request, upon determination that the downstream data link between the UN and the CS is inaccessible to the SDA, the request including at least the CID;
   receiving the content by the SDA from the CS; and
   sending the received content from the SDA to the UN.

2. The computerized method of claim 1, wherein the request for content from the user node further comprising: any of a content source (CS) and a session ID.

3. The computerized method of claim 1, further comprising:
   determining if the requested content needs to be acquired.

4. The computerized method of claim 3, further comprising:
   storing the content in a storage of the SDA upon determination that the content needs to be acquired.

5. A service delivery apparatus (SDA) for delivering popular content in an asymmetrical network topology, comprising:
   a first network interface to sniff traffic between at least a first portion of a network and at least a second portion of a network;
   a deep-packet-inspection (DPI) unit coupled to the first network interface and configured to identify at least a source of content of the sniffed traffic, the DPI unit further inspecting one or more packets, through the first network interface from the identified source of content, each packet having at least a specific source address and a specific destination address;
   a storage for storing at least information of the content received through the first network interface;
   a second network interface configured to communicate with the at least a first portion of the network and the at least a second portion of the network; and
   a processor; and
   wherein the processor is configured to cause the SDA to send an instruction to the UN to redirect content requests to the SDA on receiving a request for the content from a user node (UN), the request comprising at least a content identification (CID),
   wherein the processor is configured to send a request to a content source (CS) for the content, the request including the CID upon determination that the downstream data link between the UN and the CS is inaccessible to the SDA.

6. The SDA of claim 5, wherein the request for content from the user node further comprising: any of a content source (CS) and a session ID.

7. The SDA of claim 5, wherein the SDA is connected in the first network interface in a sniffer mode.

8. The SDA of claim 5, wherein the SDA is connected in the first network interface in a "bump-in-a-wire" mode.

9. The SDA of claim 5, wherein the DPI is configured with data types to look for in a data packet.

10. The SDA of claim 5, wherein the processor is further configured to cause the SDA to determine if the requested content needs to be stored.

11. The SDA of claim 10, wherein the processor if further configured to cause the SDA to store the content in the storage of the SDA.

\* \* \* \* \*